(12) United States Patent
Oohara et al.

(10) Patent No.: US 7,663,348 B2
(45) Date of Patent: Feb. 16, 2010

(54) DISTRIBUTED GENERATION SYSTEM AND POWER SYSTEM STABILIZING METHOD

(75) Inventors: Shinya Oohara, Hitachi (JP); Masaya Ichinose, Hitachiota (JP); Motoo Futami, Hitachiota (JP); Mitsugu Matsutake, Hitachi (JP); Shoji Fukuda, Sapporo (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 11/586,540

(22) Filed: Oct. 26, 2006

(65) Prior Publication Data

US 2007/0097565 A1 May 3, 2007

(30) Foreign Application Priority Data

Oct. 27, 2005  (JP)  ............................. 2005-312548

(51) Int. Cl.
*H02P 11/00* (2006.01)
*H02H 7/06* (2006.01)
*H02P 9/00* (2006.01)
*H02P 9/04* (2006.01)
*F03D 9/00* (2006.01)
*H02H 3/00* (2006.01)
*H02H 7/00* (2006.01)

(52) U.S. Cl. ............................. 322/24; 290/44; 361/62
(58) Field of Classification Search .................. 290/44; 322/24; 361/62
See application file for complete search history.

(56) References Cited

U.S. PATENT DOCUMENTS

| | | | |
|---|---|---|---|
| 4,694,189 A * | 9/1987 | Haraguchi et al. ........ 290/40 C |
| 4,912,618 A * | 3/1990 | Krinickas, Jr. ............... 363/37 |
| 4,952,852 A * | 8/1990 | Bando et al. ................. 318/140 |
| 5,225,712 A * | 7/1993 | Erdman ........................ 290/44 |
| 5,587,643 A * | 12/1996 | Heller ......................... 318/821 |
| 5,798,632 A * | 8/1998 | Muljadi ....................... 322/29 |
| 5,892,645 A * | 4/1999 | Watanabe et al. ............. 361/85 |
| 6,002,260 A * | 12/1999 | Lau et al. .................... 324/522 |
| 6,172,488 B1 * | 1/2001 | Mizutani et al. ............ 323/207 |
| 6,219,623 B1 * | 4/2001 | Wills ........................... 702/60 |
| 6,236,949 B1 * | 5/2001 | Hart ............................. 702/64 |
| 6,337,561 B1 * | 1/2002 | Sudou et al. .................. 322/19 |
| 6,493,125 B1 * | 12/2002 | Tanaka et al. ................ 398/95 |
| 6,545,885 B2 * | 4/2003 | Nishimura et al. ............ 363/39 |

(Continued)

FOREIGN PATENT DOCUMENTS

| | | | |
|---|---|---|---|
| EP | 1748549 A2 * | 1/2007 |
| JP | 2000-333373 | 11/2000 |
| JP | 2002-171667 | 6/2002 |

*Primary Examiner*—Nicholas Ponomarenko
*Assistant Examiner*—Pedro J Cuevas
(74) *Attorney, Agent, or Firm*—Antonelli, Terry, Stout & Kraus, LLP.

(57) ABSTRACT

A distributed generation system that can suppress a voltage fluctuation caused by a distributed generation by an apparatus of a small power capacity in the distributed generation itself and stabilize the power system voltage without inserting interharmonic voltage or current into the power system and without interference among a plurality of distributed generations. Parameter $\alpha(t)$ varying with time is estimated based on fluctuating component $\Delta P$ of the active power P generated by the distributed generation and the voltage fluctuating component $\Delta V$ attributable to the distributed generation developed at the point of connection between the distributed generation and power system. The distributed generation produces reactive power $Q=-\alpha P$ or $Q=-\alpha\Delta P$, to thereby suppresses only the voltage fluctuation of the power system attributable to the distributed generation.

15 Claims, 8 Drawing Sheets

U.S. PATENT DOCUMENTS

| | | | |
|---|---|---|---|
| 6,566,764 B2 * | 5/2003 | Rebsdorf et al. | 290/44 |
| 6,630,816 B2 * | 10/2003 | Kotani et al. | 322/37 |
| 6,879,053 B1 * | 4/2005 | Welches et al. | 290/6 |
| 6,914,763 B2 * | 7/2005 | Reedy | 361/64 |
| 6,943,462 B2 * | 9/2005 | Wobben | 290/44 |
| 6,969,922 B2 * | 11/2005 | Welches et al. | 290/1 A |
| 7,005,833 B2 * | 2/2006 | Adams | 322/37 |
| 7,016,793 B2 * | 3/2006 | Ye et al. | 702/60 |
| 7,038,329 B1 * | 5/2006 | Fredette et al. | 290/40 C |
| 7,042,110 B2 * | 5/2006 | Mikhail et al. | 290/44 |
| 7,184,903 B1 * | 2/2007 | Williams et al. | 702/60 |
| 7,202,638 B2 * | 4/2007 | Ye et al. | 322/37 |
| 7,271,571 B2 * | 9/2007 | Ye et al. | 322/36 |
| 7,304,403 B2 * | 12/2007 | Xu | 307/84 |
| 7,332,894 B2 * | 2/2008 | Ichinose et al. | 322/29 |
| 7,365,444 B2 * | 4/2008 | Lakov et al. | 290/40 R |
| 7,376,491 B2 * | 5/2008 | Walling et al. | 700/292 |
| 7,389,189 B2 * | 6/2008 | Williams et al. | 702/60 |
| 7,392,114 B2 * | 6/2008 | Wobben | 700/286 |
| 7,453,242 B2 * | 11/2008 | Ichinose et al. | 322/37 |
| 7,485,980 B2 * | 2/2009 | Ichinose et al. | 290/44 |
| 7,495,404 B2 * | 2/2009 | Sarlioglu et al. | 318/438 |
| 7,508,173 B2 * | 3/2009 | Zhou et al. | 323/207 |
| 7,511,385 B2 * | 3/2009 | Jones et al. | 290/43 |
| 7,531,911 B2 * | 5/2009 | Rivas et al. | 290/44 |
| 7,554,301 B2 * | 6/2009 | Trainer et al. | 322/37 |
| 7,569,944 B2 * | 8/2009 | Oohara et al. | 290/44 |
| 2002/0039299 A1 * | 4/2002 | Nishimura et al. | 363/39 |
| 2003/0133238 A1 * | 7/2003 | Reedy | 361/62 |
| 2004/0113592 A1 * | 6/2004 | Adams | 322/27 |
| 2005/0128659 A1 * | 6/2005 | Hibi et al. | 361/20 |
| 2007/0024247 A1 * | 2/2007 | Ichinose et al. | 322/24 |
| 2007/0086133 A1 * | 4/2007 | Loucks et al. | 361/84 |
| 2007/0182381 A1 * | 8/2007 | Kamimura et al. | 322/28 |
| 2007/0273342 A1 * | 11/2007 | Kataoka et al. | 323/234 |
| 2008/0001411 A1 * | 1/2008 | Ichinose et al. | 290/55 |
| 2008/0069692 A1 * | 3/2008 | Oohara et al. | 416/31 |
| 2008/0106099 A1 * | 5/2008 | Ichinose et al. | 290/44 |
| 2008/0143111 A1 * | 6/2008 | Ichinose et al. | 290/44 |
| 2008/0143113 A1 * | 6/2008 | Ichinose et al. | 290/44 |
| 2008/0277938 A1 * | 11/2008 | Oohara et al. | 290/44 |
| 2008/0296898 A1 * | 12/2008 | Ichinose et al. | 290/44 |
| 2008/0315685 A1 * | 12/2008 | Mandalakas et al. | 307/46 |
| 2009/0089030 A1 * | 4/2009 | Sturrock et al. | 703/7 |
| 2009/0096211 A1 * | 4/2009 | Stiesdal | 290/44 |
| 2009/0146426 A1 * | 6/2009 | Jones et al. | 290/44 |
| 2009/0146500 A1 * | 6/2009 | Jones et al. | 307/82 |
| 2009/0147549 A1 * | 6/2009 | Jones et al. | 363/37 |
| 2009/0167095 A1 * | 7/2009 | Rivas et al. | 307/87 |
| 2009/0194995 A1 * | 8/2009 | Delmerico et al. | 290/44 |

* cited by examiner

FIG.8A
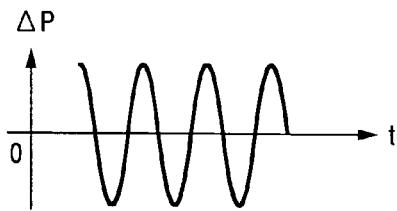
FIG.8B
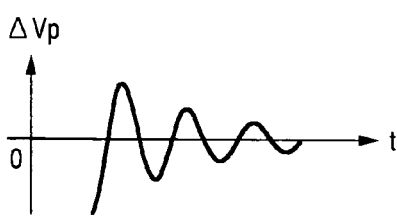
FIG.8C
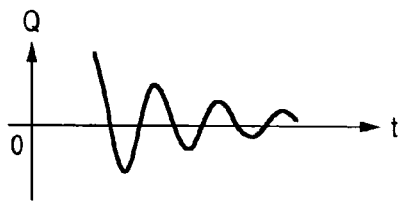
FIG.8D
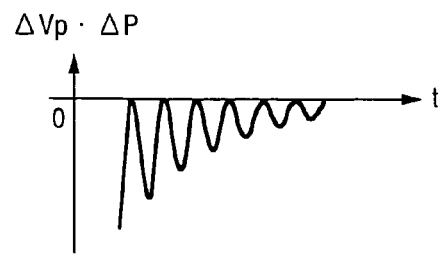
FIG.8E
FIG.9
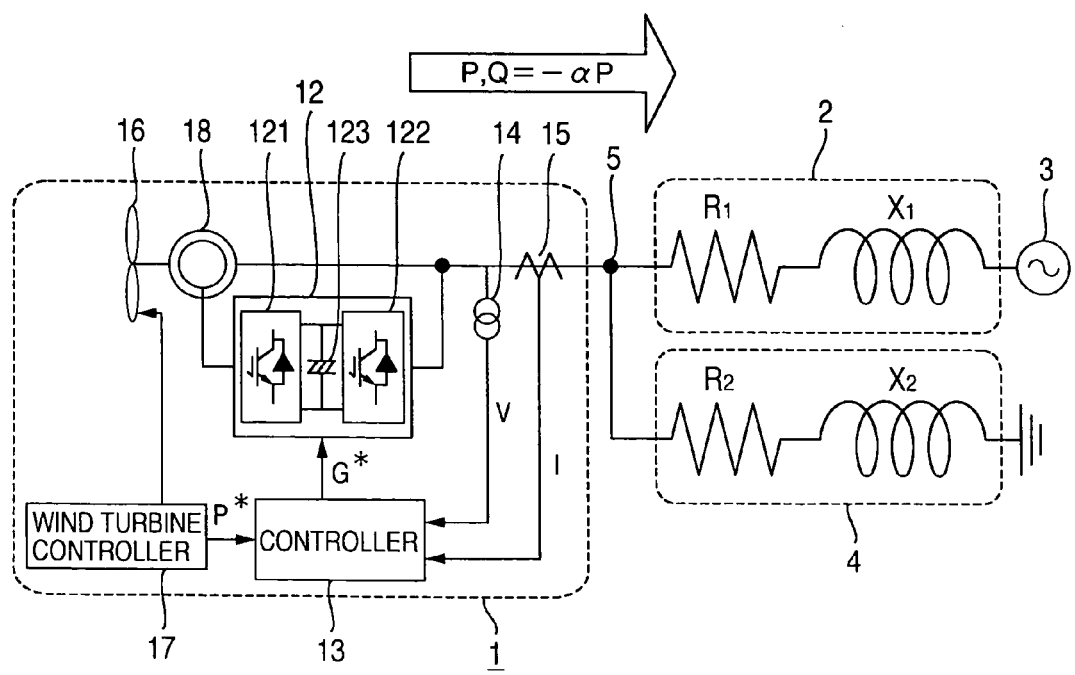

DISTRIBUTED GENERATION SYSTEM AND POWER SYSTEM STABILIZING METHOD

BACKGROUND OF THE INVENTION

This invention relates to a distributed generation system for stabilizing a power system by suppressing the voltage fluctuation in the power system and a method of stabilizing the power system.

In a power distribution system with which a distributed generation such as a wind turbine is connected, it is generally necessary to suppress the voltage fluctuation caused in the power distribution system due to the fluctuations in the output of a distributed generation or in a load connected with the power distribution system.

JP-A-2000-333373 discloses a method of compensating the fluctuations in the system voltage by a distributed generation connected with the system. Namely, in this patent document, there is disclosed a method wherein the system voltage and the system current are detected; the reactive current command for the distributed generation is generated on the basis of the detected system voltage and current; and the voltage on the distributed line is maintained constant with the aid of the reactive current command.

Further, JP-A-2002-171667 discloses a system stabilizing technique for suppressing the fluctuations in the voltage of a power distribution system by the use of a static var compensator incorporating IGBTs therein. According to this patent document, the distributed generation connected via a system interconnection line with a trunk system generates active power P and reactive power Q and feed them to the trunk system. Between the trunk system and the distributed generation is connected a self-commutated static var compensator using, for example, IGBTs. The current flowing from the distributed generation to the interconnection line is detected and the voltage is detected at the point of connection between the trunk system and the distributed generation. As a result, the active power P supplied from the distributed generation to the trunk system is detected. Finally, the IGBTs in the self-commutated static var compensator are controlled in such a manner that the fluctuation in the amplitude of the voltage at the point of connection is suppressed. More specifically, the static var compensator produces reactive power Qc such that $Qc=-[Q+(R/X)P]$, where R and X indicate the resistive and reactance components of the impedance of the interconnection line, respectively. They may change depending on the service condition of the interconnection line. Hence, the static var compensator calculates the parameter (R/X) by measuring the interharmonic current resulting from the insertion of an interharmonic voltage.

SUMMARY OF THE INVENTION

The output of a distributed generation using natural energy such as a wind turbine or a photovoltaic system varies with time as natural energy fluctuates depending on natural condition. If the distributed generation is connected at a remote end of the power distribution system, the resistance of the associated system connection line becomes large so that the voltage on the associated interconnection line fluctuates in response to the fluctuation of the active power supplied by the distributed generation. Also, in a wind farm or an offshore wind farm, which has appeared recently and been built with a multitude of wind turbines concentrated in a single site, there may be an adverse possibility that the voltage of the power distribution system fluctuates considerably due to the power output of the wind farm fluctuating to a great extent. In order for the distributed generation to be able to generate reactive power that may suppress the system voltage fluctuation, it must be necessary to measure a parameter that depends on both the system itself and the load connected therewith.

The patent document, JP-A-2000-333373, has such problems to be solved as explained below.

(1) Since the detected values of the system voltage and current are used, the distributed generation system operates to compensate for even the voltage fluctuation due to the fluctuation in the load connected with the distributed feeder. This intrinsically unnecessary compensation of the voltage fluctuation due to the load fluctuation gives rise to the generation of large reactive power, which in turn results in an increase in loss and a decrease in the power generation efficiency in the distributed generation system.

(2) Since the detected values of the system voltage and current are used, the values of the current and the voltage of different distributed generation connected with the distributed feeder are also detected. Consequently, when a plurality of distributed generation serves to control the voltage on the distributed feeder so as to maintain it as a predetermined value, control interference may occur among those distributed generation.

On the other hand, according to JP-A-2002-171667, the insertion of interharmonic voltage may incur a large disturbance in the power system if there are involved a plurality of distributed generations. There must also be attained a requirement that the system voltage fluctuation be suppressed without more than one distributed generations interfering with one another.

An object of this invention is to suppress the voltage fluctuation in the power system resulting from the provision of the distributed generation by means of an apparatus or facility of a small power capacity.

Another object of this invention is to provide a distributed generation system wherein control interference hardly occurs among a plurality of distributed generations.

Still another object of this invention is to provide a distributed generation which hardly causes disturbance in the power system.

In one aspect of this invention, a control means is provided which detects the output of a distributed generation and controls the distributed generation according to the detected output so as to compensate for the fluctuating component of the voltage at the point of connection attributable to the output of the distributed generation.

More specifically, the time-varying parameter $\alpha(t)=R/X$, or in other words, the ratio $P/Q$ (or $\Delta P/Q$) of active power P (or its fluctuating component $\Delta P$) to reactive power Q is estimated on the basis of both the detected value of the fluctuating component $\Delta P$ of the active power P generated by the distributed generation itself and the detected value of the voltage fluctuation $\Delta V$ resulting from the fluctuating component $\Delta P$ and developed at the point of connection, and then reactive power Q given by the expression $Q=-\alpha(t)P$ (or $Q=-\alpha(t)\Delta P$) is generated by the distributed generation.

In another aspect of this invention, the output of the distributed generation is detected so as to compensate for the fluctuating component of the voltage at the point of connection and a controller is provided which controls the static var compensator (SVC) placed near the distributed generation, on the basis of the detected output.

In still another aspect of this invention, reactive power is generated in proportion to the fluctuation of active power originating in the distributed generation itself and the proportional coefficient $\alpha(t)=R/X$, or in other words, the ratio $P/Q$ (or ΔP/Q) of active power P (or its fluctuating component ΔP) to reactive power Q is dynamically varied depending on the measured values.

Other objects and features of this invention will be clarified in the following description of the embodiments of this invention.

BRIEF DESCRIPTION OF THE DRAWINGS

FIGS. 8A through 8E are operating waveforms of the reactive power command calculator 134 for larger values of the control parameter;

FIG. 9 is a schematic circuit diagram of a doubly-fed induction generator system (a power generation system with a secondary excitation), as another embodiment of this invention;

DESCRIPTION OF THE EMBODIMENTS

In the following are described embodiments of this invention with reference to the attached drawings, wherein the distributed generation or the static var compensator placed near it is controlled by obtaining the control parameter for suppressing the system voltage fluctuation caused by the distributed generation itself, on the basis of the output condition of the distributed generation.

Embodiment 1

Figure 1:
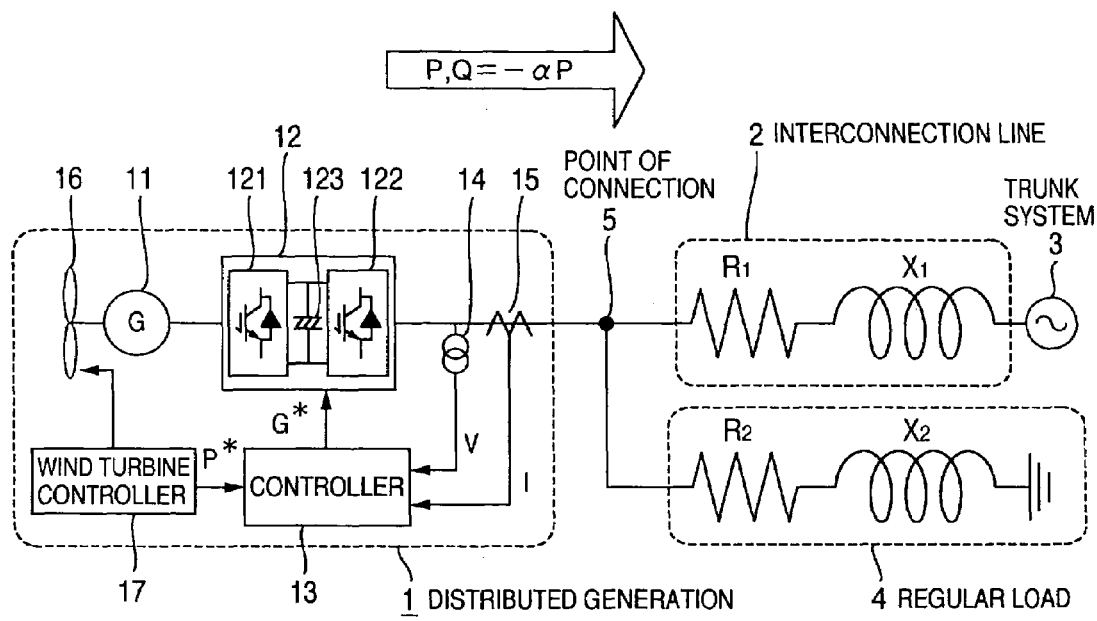
FIG. 1 is a block diagram of a distributed generation provided with a power system stabilizer, as a first embodiment of this invention.

FIG. 1 schematically shows a block diagram of a distributed generation system provided with a power system stabilizer, as a first embodiment of this invention. A distributed generation 1 is connected via a system interconnection line or cable 2 with a trunk system 3. Let the resistance and the reactance of the impedance of the distribution feeder 2 be represented by $R_1$ and $X_1$, respectively. At the point 5 of interconnection between the distributed generation 1 and the interconnection line 2, or at any point on the interconnection line is connected a regular load 4 such as any of domestic electric appliances or factory machinery which consumes electric power. Similarly, the regular load consists of its resistance $R_2$ and reactance $X_2$.

In this embodiment, a wind turbine generator system serves as the distributed generator 1. The distributed generator 1 comprises a power generator 11, a power converter 12, a controller 13, a voltage detector 14 and a current detector 15. The wind energy received by the blades 16 of the wind turbine generator system is converted to three-phase alternating electric energy by means of the generator 11. The electric energy is in turn fed to the power converter 12. For example, a permanent-magnet generator is used as the generator 11. On the basis of the pitch angle of the blades 16 and the wind velocity, a wind turbine controller 17 calculates the power command P* for the maximum power that the wind turbine system can generate. The power command P* is then fed to the controller 13. The power converter 12 mainly comprises an AC/DC converter 121, a DC/AC converter 122 and a DC-link capacitor (smoothing capacitor) 123. The converters 121 and 122 are built with, for example, semiconductor switching elements such as IGBTs. The AC/DC converter 121 converts the AC power generated by the generator 11 to corresponding DC power, which is in turn fed to the DC-link capacitor 123. The DC/AC converter 122 converts the DC power stored in the DC-link capacitor 123 to corresponding AC power. Accordingly, the corresponding active power P following the power command P* is then fed to the power system. The controller 13 produces a gate pulse signal G* for controlling the power controller 12 on the basis of the voltage value V and the current value I obtained by the voltage detector 14 and the current detector 15, respectively, and the power command P* produced by the wind turbine controller 17.

Figure 2:
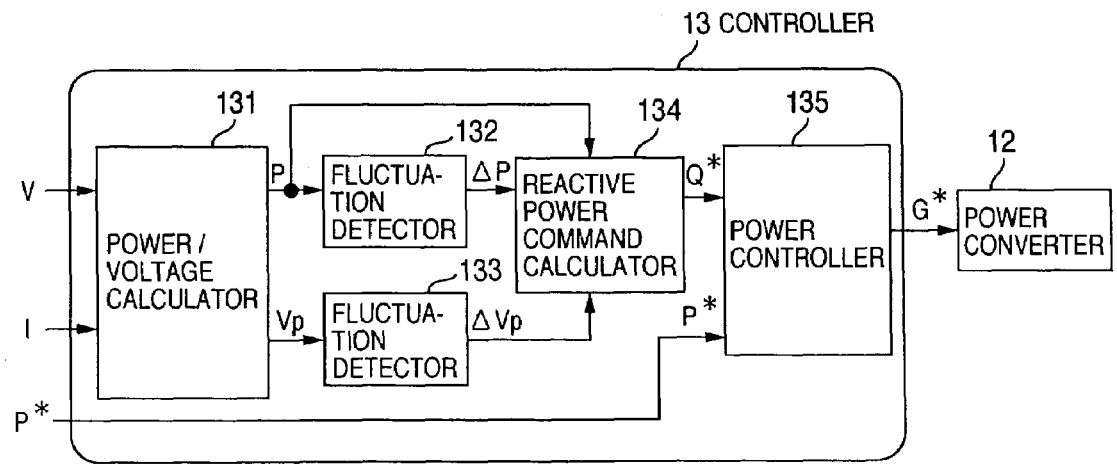
FIG. 2 is a block diagram of a controller 13 as shown in FIG. 1.

FIG. 2 concretely shows in block diagram the controller 13 shown in FIG. 1. The controller 13 includes a power/voltage calculator 131 which calculates, from the detected voltage value V and the detected current value I, the active power P to be generated by the distributed generation 1 and the voltage amplitude value Vp at the point 5 of connection. For example, the active power P and the voltage amplitude value Vp can be obtained by using the following expressions (1) and (2), respectively.

$$P = Id \times Vd + Iq \times Vq \qquad (1)$$

$$Vp = \sqrt{(Vd^2 + Vq^2)} \qquad (2)$$

In these expressions (1) and (2), Id and Iq are the d-axis and q-axis components, respectively, obtained through the coordinate transformation of the current value I by using a rotational coordinate system whereas Vd and Vq the d-axis and q-axis components, respectively, obtained through the coordinate transformation of the voltage value V by using the rotational coordinate system.

The power/voltage calculator 131 includes a phase detector (not shown) which detects the phase signals cos(ωt) and sin(ωt) that follow the U-phase of the system voltage. When the phase signal cos(ωt) coincides with the U-phase of the system voltage, the quantities Id, Iq, Vd and Vq are calculated by the following expressions (3) and (4).

$$\begin{pmatrix} Id \\ Iq \end{pmatrix} = \frac{2}{3} \begin{pmatrix} \cos(\omega t) & \sin(\omega t) \\ -\sin(\omega t) & \cos(\omega t) \end{pmatrix} \begin{pmatrix} 1 & -0.5 & -0.5 \\ 0 & \sqrt{3}/2 & -\sqrt{3}/2 \end{pmatrix} \begin{pmatrix} Iu \\ Iv \\ Iw \end{pmatrix} \quad (3)$$

$$\begin{pmatrix} Vd \\ Vq \end{pmatrix} = \frac{2}{3} \begin{pmatrix} \cos(\omega t) & \sin(\omega t) \\ -\sin(\omega t) & \cos(\omega t) \end{pmatrix} \begin{pmatrix} 1 & -0.5 & -0.5 \\ 0 & \sqrt{3}/2 & -\sqrt{3}/2 \end{pmatrix} \begin{pmatrix} Vu \\ Vv \\ Vw \end{pmatrix} \quad (4)$$

In the expressions (3) and (4), Iu, Iv and Iw are the U-phase, V-phase and W-phase components of the three-phase current detected by the current detector 15 whereas Vu, Vv and Vw are the U-phase, V-phase and W-phase components of the three-phase voltage detected by the voltage detector 14.

Fluctuation detectors 132 and 133 respectively receive the active power P and the voltage amplitude value Vp, and correspondingly extract the fluctuating component ΔP of the active power P and the fluctuating component ΔVp of the voltage amplitude. The extracted fluctuating components ΔP and ΔVp, and the calculated active power P are fed to a reactive power command calculator 134. The reactive power command calculator 134 produces a reactive power command Q*. A power converter 135 derives a gate pulse signal G* from the active power command P* and the reactive power command Q*. The gate pulse signal G* is fed to the power converter 12 which controls the output power of the distributed generation.

The structure and the operation of the fluctuation detector 132 is now described with reference to FIG. 3.

Figure 3:
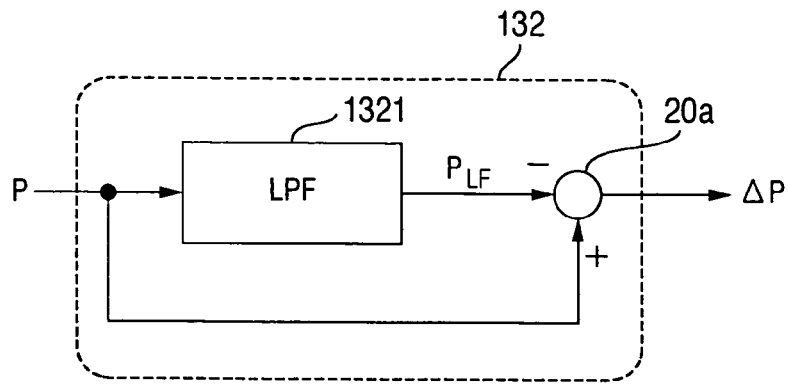
FIG. 3 is a block diagram of an active power fluctuation detector which extracts the fluctuating component ΔP of the active power.

FIG. 3 is a signal flow diagram used for obtaining the fluctuating component ΔP of the active power P. The active power P is fed to a low-pass filter 1321, which delivers an output $P_{LF}$. The active power P is also fed to a subtractor 20a which receives the output $P_{LF}$ of the low-pass filter 1321. The subtractor 20a delivers the difference between the active power P and the output $P_{LF}$ of the low-pass filter 1321, i.e. the fluctuating component ΔP. This process is given by the following expression (5).

$$P - P_{LF} = \Delta P \quad (5)$$

Namely, since the output $P_{LF}$ of the low-pass filter that is the low frequency component of the active power P is eliminated from the active power P, the component ΔP contains only high frequency component. That is, the fluctuation detector 132 has the characteristic of a high-pass filter.

The fluctuation detector 132 is now described in terms of its transfer function. It is assumed that the low-pass filter LPF is represented as a first order lag element and that the cutoff frequency of the low-pass filter LPF is fc [rad/s]. Then, the transfer function of the fluctuation detector 132 is given by the following expression (6).

$$1 - \frac{1}{1 + \frac{1}{fc}s} = \frac{\frac{1}{fc}s}{1 + \frac{1}{fc}s} = \frac{s}{fc + s} \quad (6)$$

Figure 4:
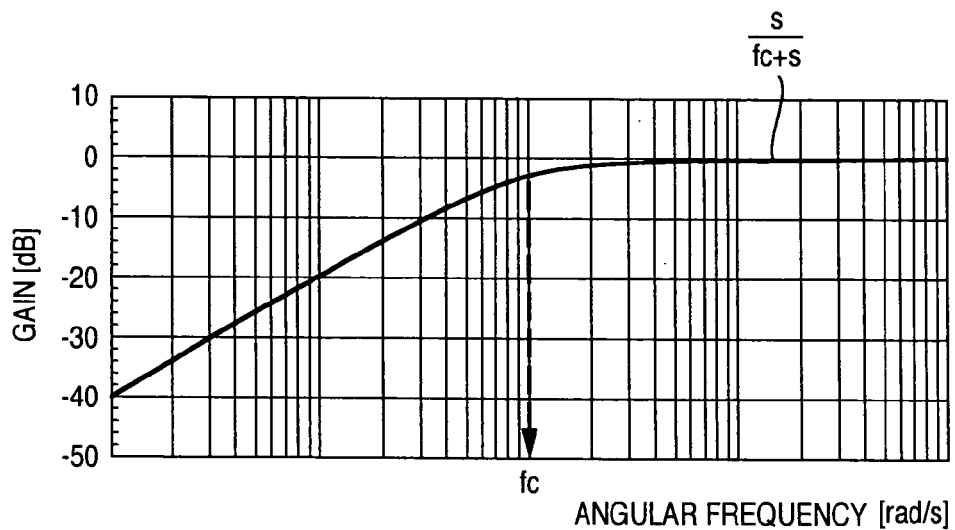
FIG. 4 is a graph showing a gain characteristic, given by the expression (6), of a filter used to obtain the active power fluctuation.

FIG. 4 graphically shows the gain characteristic derived from the expression (6). The graph depicts the characteristic of a high-pass filter having the cutoff frequency fc determined by the low-pass filter 1321. Thus, only the fluctuating component ΔP having constituent frequencies higher than the cutoff frequency fc can be obtained.

Figure 5:
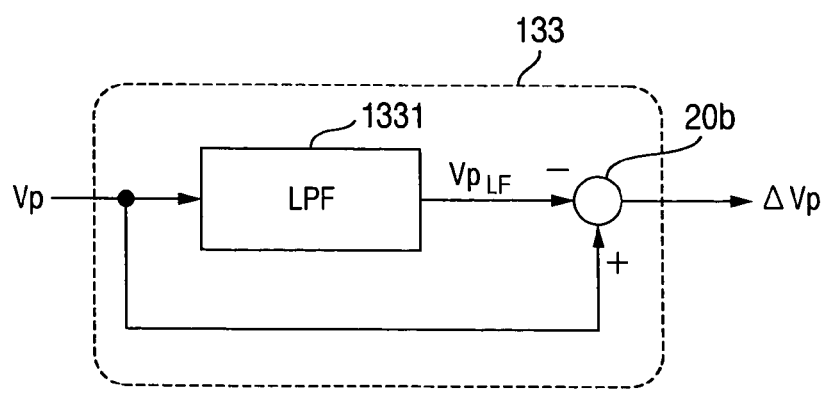
FIG. 5 is a block diagram of a voltage fluctuation detector 133 which extracts the fluctuating component ΔVp of the voltage amplitude Vp.

FIG. 5 is a signal flow diagram for the fluctuation detector 133 which extracts the fluctuating component ΔVp of the voltage amplitude Vp. The fluctuation detector 133 also includes a low-pass filter 1331 and a subtractor 20b, as shown in the diagram of the fluctuation detector 132 in FIG. 3, and has the characteristic of a high-pass filter similar to that shown in FIG. 4. Accordingly, the fluctuation detector 133 has a function of extracting that fluctuating component ΔVp of the voltage developed at the point of connection which results from the active power fluctuation ΔP generated by the distributed generation 1.

Description is now made of how the reactive power command Q* is generated.

The period (the reciprocal of fluctuating frequency $f_L$) of the voltage fluctuation caused by the regular load 4 is generally long and the fluctuating frequency $f_L$ is lower than the cutoff frequency fc of the fluctuation detector 132 or 133, so that the regular load 4 contributes little to the voltage fluctuation ΔVp. On the other hand, the voltage fluctuation representing the fluctuating component ΔP of the active power P generated by the distributed generation 1 contributes much to the voltage fluctuation ΔVp. When the distributed generation 1 feeds both active power P and reactive power Q to the power system 3, the fluctuating component ΔVp1 of the system voltage amplitude Vp associated with the active power P and the fluctuating component ΔVp2 of the system voltage amplitude Vp associated with reactive power Q, are respectively given by the following expressions (7) and (8).

$$\Delta Vp1 \approx (R_{12}/Vp)P \quad (7)$$

$$\Delta Vp2 \approx (X_{12}/Vp)Q \quad (8)$$

In these expressions, $R_{12}$ and $X_{12}$ are respectively the resistive and reactive components of the composite impedance consisting of the impedance of the interconnection line 2 and that of the regular load 4, as viewed from the side of the distributed generation 1. In order for the distributed generation 1 to be able to control the voltage fluctuation ΔVp1 by using its reactive power output, it suffices to produce such reactive power command Q* as given by the following expression (9).

$$\Delta Vp1 + \Delta Vp2 = \text{Expression (7)} + \text{Expression (8)} = 0 \therefore Q^* = -(R_{12}/X_{12})P \quad (9)$$

Here, the expressions (7) and (8) are approximating expressions used when current is small. The expression (9), when used for large current, is transformed as expressed as follows.

$$Q^* = -\frac{|Z_{12}|P - R_{12}Vp^2}{|Z_{12}|Q - X_{12}Vp^2}P \quad (10)$$

Now, the parameter α(t) is defined as given by the following expression (11).

$$\alpha(t) = R_{12}/X_{12} \text{ or } \frac{|Z_{12}|P - R_{12}Vp^2}{|Z_{12}|Q - X_{12}Vp^2} \quad (11)$$

The regular load 4 varies with time and therefore the coefficient α(t) derived from the composite impedance obtained with respect to the interconnection line 2 and the regular load 4 also varies with time. In order to generate such suitable reactive power as to suppress the system voltage fluctuation, it is necessary to measure the parameter $\alpha(t)$ and update it continuously.

Figure 6:
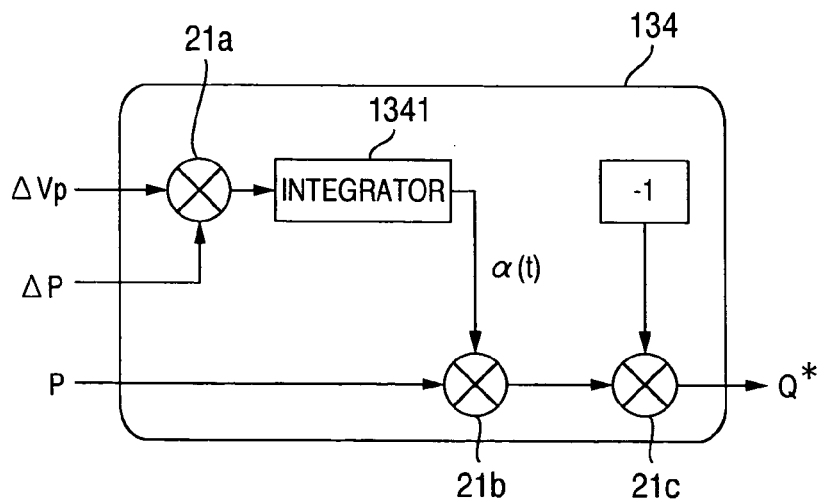
FIG. 6 is a block diagram of a reactive power command calculator 134 as shown in FIG. 2.
Figure 7A:
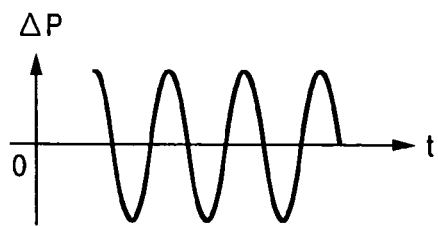
FIGS. 7A through 7E are operating waveforms of the reactive power command calculator 134 for smaller values of the control parameter.
Figure 7D:
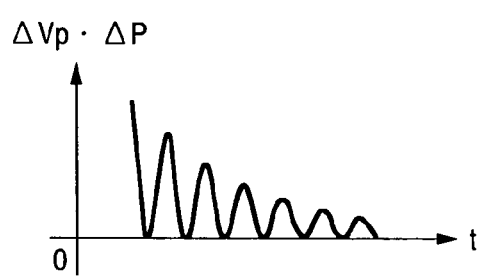
Figure 7B:
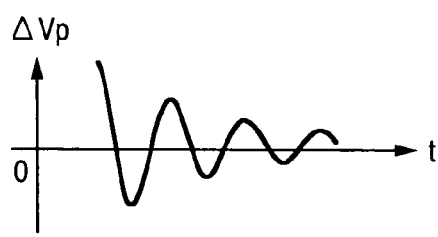
Figure 7E:
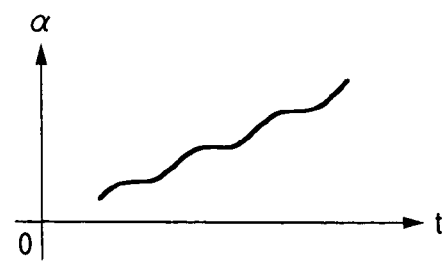
Figure 7C:
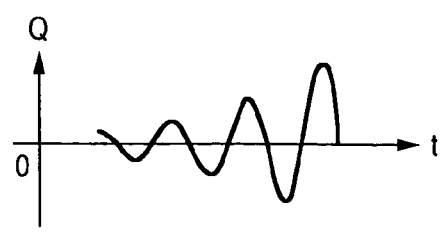

FIG. 6 is a signal flow diagram for the reactive power command calculator 134 which includes the calculation of the parameter $\alpha(t)$, used in the first embodiment of this invention. As seen in FIG. 6, the parameter $\alpha(t)$ is obtained by integrating by an integrator 1341 the product of the voltage fluctuation $\Delta Vp$ and the active power fluctuation $\Delta P$, the product being obtained by a multiplier 21a. The obtained parameter $\alpha(t)$ is multiplied by the active power P in a multiplier 21b and the product as the output of the multiplier 21b is further fed to a multiplier 21c, which multiplies the input thereto by −1 (minus one). The output of the multiplier 21c is the reactive power command Q* which is required to suppress the system voltage fluctuation. This is mathematically represented by the following expression (12).

$$Q^* = -\alpha(t)P = -\{\int (\Delta Vp \cdot \Delta P) dt\} P \quad (12)$$

As the magnitude of the parameter $\alpha(t)$ approaches a suitable value, the system voltage fluctuation is suppressed, that is, the system voltage fluctuating component $\Delta Vp$ approaches zero so that the integrated result converges to an optimal value defined by the expression (11).

Description is now made of the operation of the reactive power command calculator 134 shown in FIG. 6.

FIG. 7A through 7E show waveforms illustrative of the operation of the reactive power command calculator 134 when the coefficient $\alpha(t)$ is smaller than its optimal value at a time instant t=0 and when the reactive power output Q of the distributed generation 1 is not large enough to suppress the voltage fluctuation $\Delta Vp$. Since the active power fluctuation $\Delta P$ gives rise to the corresponding voltage fluctuation $\Delta Vp$, the phase of the active power fluctuation $\Delta P$ coincides with that of the corresponding voltage fluctuation $\Delta Vp$ so that the product $\Delta P \cdot \Delta Vp$ is always greater than zero. The parameter $\alpha(t)$, which is the output of the integrator 1341 that receives the product $\Delta P \cdot \Delta Vp$ as its input, increases with time while the product $\Delta P \cdot \Delta Vp$ remains positive. Accordingly, the reactive power command Q* that is the product of the parameter $\alpha(t)$ and the active power P, also increases with the result that the voltage fluctuation $\Delta Vp$ converges to zero.

FIGS. 8A through 8E show waveforms illustrative of the operation of the reactive power command calculator 134 when the coefficient $\alpha(t)$ is relatively large at a time instant t=0 and when the reactive power output Q of the distributed generation 1 is much greater than its optimal value that can optimally suppress the voltage fluctuation $\Delta Vp$. In this case, contrary to the case illustrated in FIGS. 7A through 7E, the phase of the active power fluctuation $\Delta P$ is reversed with respective to the phase of the voltage fluctuation $\Delta Vp$ and therefore the product $\Delta P \cdot \Delta Vp$ always remains negative. Accordingly, the parameter $\alpha(t)$, which is the output of the integrator 1341 that receives the product $\Delta P \cdot \Delta Vp$ as its input, decreases with time while the product $\Delta P \cdot \Delta Vp$ remains negative. Consequently, the reactive power Q that is the product of the parameter $\alpha(t)$ and the active power fluctuation $\Delta P$, also decreases with the result that the voltage fluctuation $\Delta Vp$ converges to zero.

The above described modes of variation in the parameter $\alpha(t)$ occur in ideal cases where the system voltage amplitude fluctuation $\Delta Vp$ is supposed to result only from the active power fluctuation $\Delta P$ of the distributed generation 1. In any practical case, the voltage fluctuation $\Delta V$ includes a fluctuating component originating in the load fluctuation. Even in such a case, however, by integrating the product $\Delta P \cdot \Delta Vp$ by the integrator 1341, the contribution of that particular voltage fluctuation $\Delta Vp$ originating in any equipment other than the distributed generation 1 which has no correlation with the active power fluctuation $\Delta P$ of the distributed generation 1, is offset. The reason for this is as follows. If $\Delta P$ and $\Delta Vp$ are not correlated with each other, the product $\Delta P \cdot \Delta Vp$, when integrated, approximately vanishes since they oscillate taking positive and negative values. Consequently, $\alpha(t)$ converges to an appropriate value as time lapses.

The active power P generated by the distributed generation 1 includes a fluctuating component having a long oscillation period and a fluctuating component having a short oscillation period. The fluctuation in the wind velocity is the main contribution to such fluctuations. Another such contribution is the short period component resulting from the "tower shadow effect". The tower shadow effect is a phenomenon in which each of the blades 16 of a wind turbine, when it comes to the position parallel to the tower, receives less wind power than it is in the position unparallel to the tower since the wind course is obstructed by the tower. This phenomenon naturally causes a fluctuation in the generated active power. Since the rotational frequency of the wind turbine blades 16 is usually 1 to 3 Hz and an ordinary wind turbine has three blades, then the active power fluctuation due to the tower shadow effect has a frequency of nearly 3 Hz. In order to detect this component originating in the tower shadow effect, the low-pass filters 1321 and 1331 may be so designed as to have a cutoff frequency fc of a few Hz or lower.

In the foregoing, this invention has been described as applied to a power generation system connected with a power system via a power converter but it may also be applied to other distributed generation systems which can generate active reactive powers.

FIG. 9 schematically shows the overall structure of a doubly-fed induction generator system (secondary excitation type power generation system) according to another embodiment of this invention. In FIG. 9, those elements which appear also in FIG. 1 are indicated with the same reference numerals as in FIG. 1 and the explanation of those elements is omitted. In this embodiment, the rotor winding of the doubly-fed induction generator 18 is connected with an AC/DC converter 121 and the stator winding of the generator 18 is connected with a power system. A DC/AC converter 122 in a power converter 12 is connected with the power system. In the doubly-fed induction generation system as well, the power converter 12 can control the reactive power Q generated by the distributed generation 1, and hence a controller can be employed which suppresses voltage fluctuation as described in reference to FIG. 1.

With this first embodiment of the invention, the control parameter for suppressing the voltage fluctuation caused due to the fluctuation in the system impedance as viewed from the distributed generation 1 can be so corrected as to assume an appropriate value, on the basis of the active power P, its fluctuating component $\Delta P$, both generated by the distributed generation 1, and the voltage fluctuation $\Delta Vp$. Besides, there is no need of a static var compensator and a special apparatus for obtaining impedance.

In addition, the distributed generation generates the reactive power in proportion to the active power which it also generates; the proportional coefficient $\alpha$ is continuously varied by estimating the system impedance; and only the voltage fluctuation resulting from the active power fluctuation which the distributed generation develops, can be suppressed without being affected by the power fluctuations in other equipment connected with the main system. Further, since the generated reactive power has only to suppress the voltage fluctuation in the distributed generation itself, the generated reactive power may be of relatively small value.

Furthermore, even in a case where a plurality of distributed generations are installed, the influence by any voltage fluctuating component having no correlation with the power generated by a particular one of the distributed generations can be decreased by detecting the active power fluctuation ΔP and the voltage fluctuating component ΔVp, both developed in that particular distributed generation. Consequently, interference in control for suppressing voltage fluctuation among the plural distributed generations can be prevented.

Embodiment 2

Figure 10:
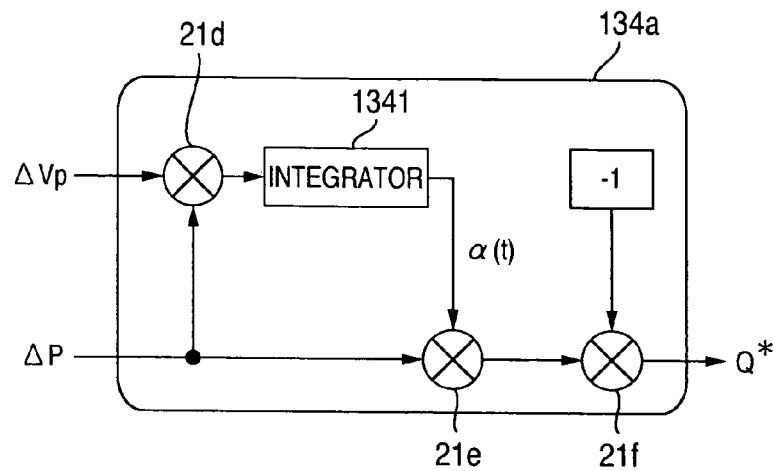
FIG. 10 is a block diagram of a reactive power command calculator 134a including the calculation of the parameter α(t), used in a distributed generation system provided with a power system stabilizer, as a second embodiment of this invention.

FIG. 10 schematically shows the structure of a reactive power command calculator 134a which includes the calculation of a parameter α(t) for a distributed generation system provided with a power system stabilizing apparatus according to the second embodiment of this invention. FIG. 10 is used here in place of FIG. 6. This second embodiment differs from the first embodiment in the manner that the reactive power command Q* is generated.

The voltage amplitude Vp at the point 5 of connection fluctuates in response to the fluctuation ΔP of the active power P generated by the distributed generation 1. Apparatuses belonging to the power system, such as SVRs (series voltage regulators), transformers, power generators, SVCs (static var compensators), etc. can control the long period component of the voltage amplitude fluctuation in such a manner that the extent of that fluctuation may fall within a predetermined range. In this case, therefore, the distributed generation has only to suppress the short period component of the voltage amplitude fluctuation alone which the voltage regulating apparatuses in the power system cannot follow. Namely, this second embodiment differs from the first embodiment in that the distributed generation 1 generates only the reactive power in proportion to the short period fluctuating component of the active power.

The concrete structure of this embodiment is same as the first embodiment as far as FIGS. 1 through 5 are concerned. However, a concrete structure of the reactive power command calculator 134 shown in FIG. 2 is in the form of a reactive power command calculator 134a shown here in FIG. 10, rather than that shown in FIG. 6. As shown in FIG. 10, in the same manner as in the first embodiment, the reactive power command calculator 134a calculates the control parameter α(t) on the basis of the active power fluctuating component ΔP and the voltage fluctuating component ΔVp. This second embodiment produces such reactive power command Q* that is proportional only to the active power fluctuating component ΔP, Q* being calculated in accordance with the following expression (13).

$$Q^* = -\alpha(t)\Delta P \quad (13)$$

In this way, the distributed generation 1 suppresses only the short period component of the voltage fluctuation.

According to the second embodiment, it suffices to generate reactive power in proportion only to the fluctuating component of active power and therefore as compared with a case where it is necessary to produce reactive power in proportion to active power as a whole, the magnitude of needed reactive power may be further reduced. Moreover, the ratio of active power to reactive power to be generated in proportion to active power can be derived from voltage and power and be always maintained at a predetermined value. Since the ratio can be very precisely maintained at such a predetermined value, the magnitude of the reactive power generated by the distributed generation 1 can be reduced with the result that the capacities of apparatuses associated with the distributed generation 1 can also be reduced.

It is also possible to add a steady-state offset component Qo to the reactive power command Q* as given by the following expression (13').

$$Q^* = -\alpha(t)\Delta P + Qo \quad (13')$$

The result obtained from using this expression (13') provides the same effect of suppressing voltage fluctuation as in the case where the expression (13) is used.

Embodiment 3

Figure 11:
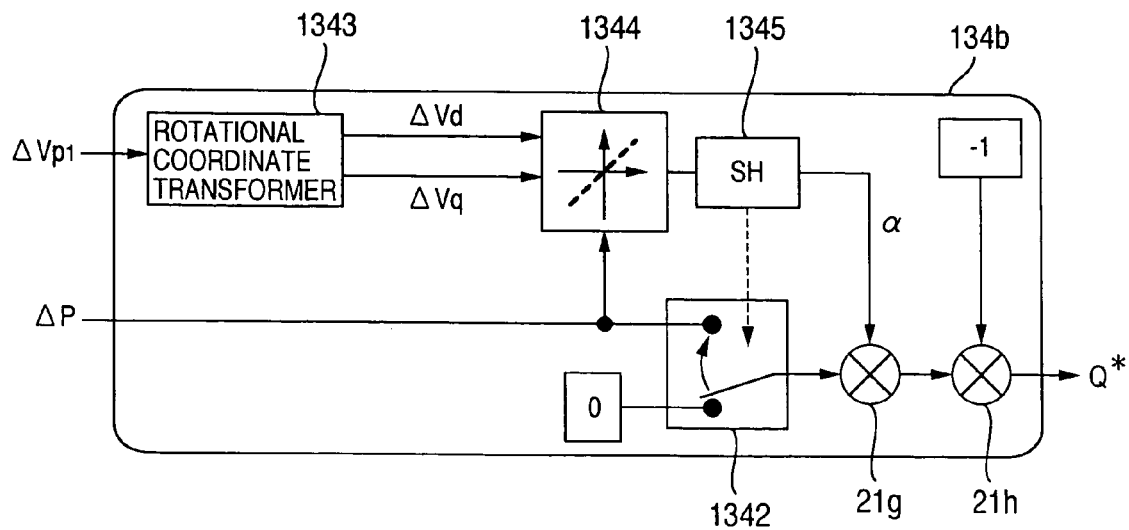
FIG. 11 is a block diagram of a reactive power command calculator 134b including the calculation of the parameter α(t), used in a distributed generation system provided with a power system stabilizer, as a third embodiment of this invention.

FIG. 11 schematically shows the structure of a reactive power command calculator 134b which includes the calculation of a parameter α(t) for a distributed generation system provided with a power system stabilizing apparatus, according to the third embodiment of this invention. FIG. 11 is used here in place of FIG. 6 or FIG. 10. This third embodiment differs from the first and second embodiments in the manner that the reactive power command Q* is generated.

To begin with, to obtain the parameter α(t), let a selector 1342 choose zero (0) as its output and the reactive power command calculator 134b issues a zero reactive power command, i.e. Q*=0. Under this condition, the distributed generation 1 starts operating with its output reactive power Q equal to 0. Now, the system voltage fluctuation ΔVp1 due to the active power fluctuation ΔP is fed to a rotational coordinate transformer 1343 shown in FIG. 11 so as to be subjected to coordinate transformation. Coordinate transformation is performed by using the expression (4) which is used with the first embodiment of the invention. The rotational coordinate transformer 1343 calculates the d-axis component ΔVd and the q-axis component ΔVq of the system voltage fluctuation ΔVp1 and send out the result of calculation to a parameter calculator 1344.

The parameter calculator 1344 receives, besides the d-axis component ΔVd and the q-axis component ΔVq of the system voltage fluctuation ΔVp1, ΔP as its input and then calculates the parameter α(t) on the basis of ΔP, ΔVd and ΔVq. The obtained parameter α(t) is held in a sample & hold circuit 1345 until the time of next calculation is reached. The relationships among ΔP, ΔVd and ΔVq are represented by the following expressions (14) and (15).

$$\Delta Vd = (R_{12}/Vp0)\Delta P \quad (14)$$

$$\Delta Vq = -(X_{12}/Vp0)\Delta P, \quad (15)$$

where Vp0 is the reference voltage of the power system.

Figures 12A, 12B:
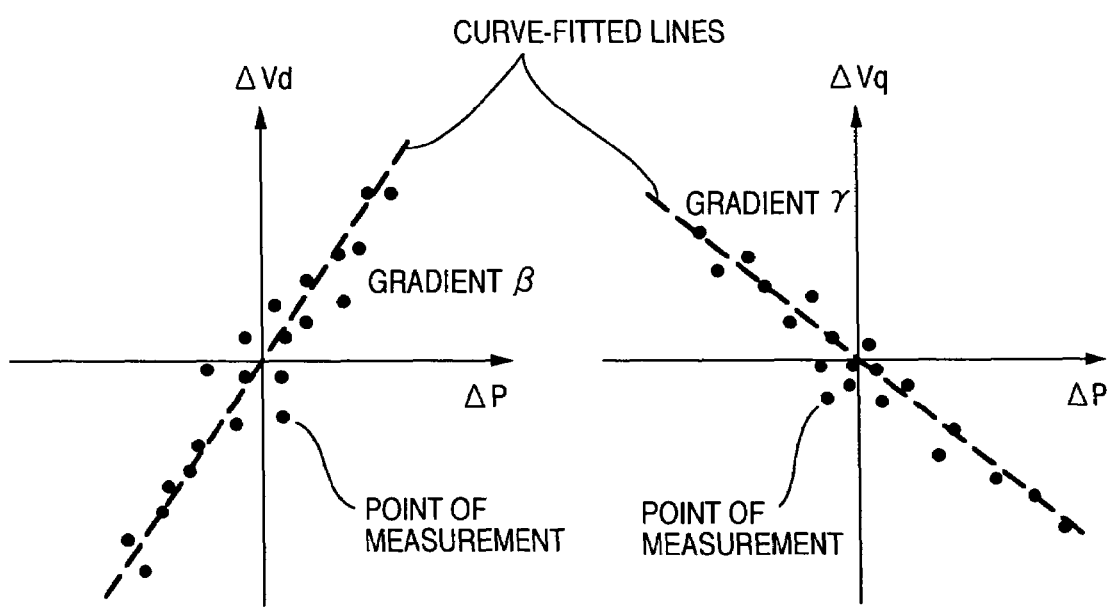
FIGS. 12A and 12B are graphs showing the results of measurement plotted with the abscissas graduated in ΔP and the ordinates in ΔVd and ΔVq, respectively, in the reactive power command calculator 134b of FIG. 11.

FIGS. 12A and 12B graphically show the results of measurements, with FIG. 12A having its abscissa graduated in ΔP and its ordinate graduated in ΔVd, and FIG. 12B having its abscissa and ordinate in ΔP and ΔVq, respectively. As depicted in FIGS. 12A and 12B, the measured values concentrate on and around the straight lines having gradients β=(R$_{12}$/Vp0) and γ=-(X$_{12}$/Vp0). Curve fitting using the least square method is applied to the measured values. Consequently, the gradients are determined so that the parameter α(t) is obtained as given by the following expression (16).

$$\alpha = -\beta/\gamma = (R_{12}/X_{12}) \quad (16)$$

As a result of the foregoing manipulation, α is obtained and then held in the sample & hold circuit 1345 until the next time of calculation; the output of the selector 1342 is switched to ΔP; and the product of P and α, or of ΔP and α, can be produced as a reactive power command Q*, as described with the first (FIG. 6), or the second (FIG. 10) embodiments.

In this third embodiment of the invention shown in FIG. 11, the active power fluctuating component ΔP is fed as input to the reactive power command calculator 134b as in the second embodiment shown in FIG. 10 while the active power P itself is not employed as input unlike the first embodiment shown in FIG. 6. However, it may be possible to provide a structure wherein the active power P itself is supplied to the upper input contact of the selector 1342 in place of the active power fluctuating component ΔP.

According to this third embodiment of the invention, the parameter α can be obtained on the basis of the d-axis and the q-axis components of the voltage fluctuation ΔV so that almost the same effect can be obtained as obtained with the first and the second embodiment.

Embodiment 4

Figure 13:
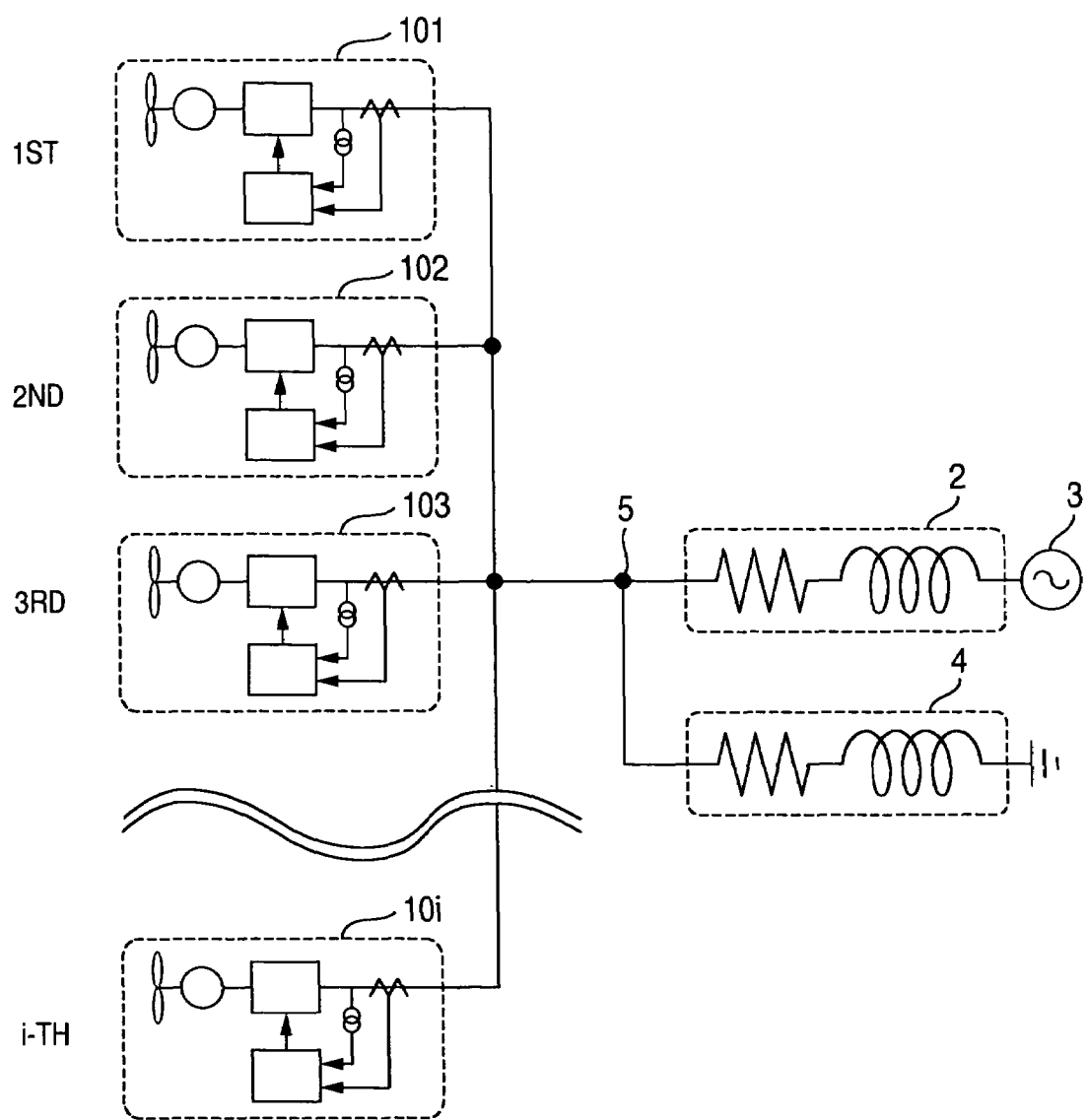
FIG. 13 is a schematic block diagram of a distributed generation provided with a power system stabilizer, including a plurality of distributed generations, as a fourth embodiment of this invention.

FIG. 13 schematically shows the structure of a power system stabilizing apparatus provided with a plurality of distributed generation, according to the fourth embodiment of this invention. This fourth embodiment differs from the first through the third embodiments only in that a plurality of distributed generations are connected with the power system.

Each of individual distributed generations 101, 102, 103, . . . 10i, . . . is of the same structure and function as in the first, second or third embodiment. Namely, the $i^{th}$ distributed generation produces its respective control parameter αi(t) on the basis of the active power fluctuation ΔPi developed by its own and the corresponding system voltage fluctuation ΔVpi. The procedure for obtaining the control parameter αi(t) is similar to that employed in the first through third embodiments. Description is made here in reference to the first embodiment.

In order to suppress the system voltage fluctuation, the $i^{th}$ distributed generation 10i produces reactive power such that Qi=−αi(t)Pi, where Pi is the active power generated by the $i^{th}$ distributed generation 10i. If such a procedure as used in the second embodiment is employed, the produced reactive power will be changed in such a manner that Qi=−αi(t)ΔPi. Since the parameter αi(t) is obtained in response to the voltage fluctuation ΔVp1i originating in the active power fluctuation ΔPi developed in the $i^{th}$ distributed generation 10i as described in the first embodiment, the parameter αi(t) for suppressing the system voltage fluctuation can be properly obtained even though plural distributed generations are connected with the main power distribution system.

With this fourth embodiment, each distributed generation 10i has only to suppress the voltage fluctuation ΔVp1i due to the active power fluctuation ΔPi developed in the distributed generation 10i itself and therefore the overall system voltage fluctuation can be suppressed without any interference in control among the individual distributed generations.

Embodiment 5

Figure 14:
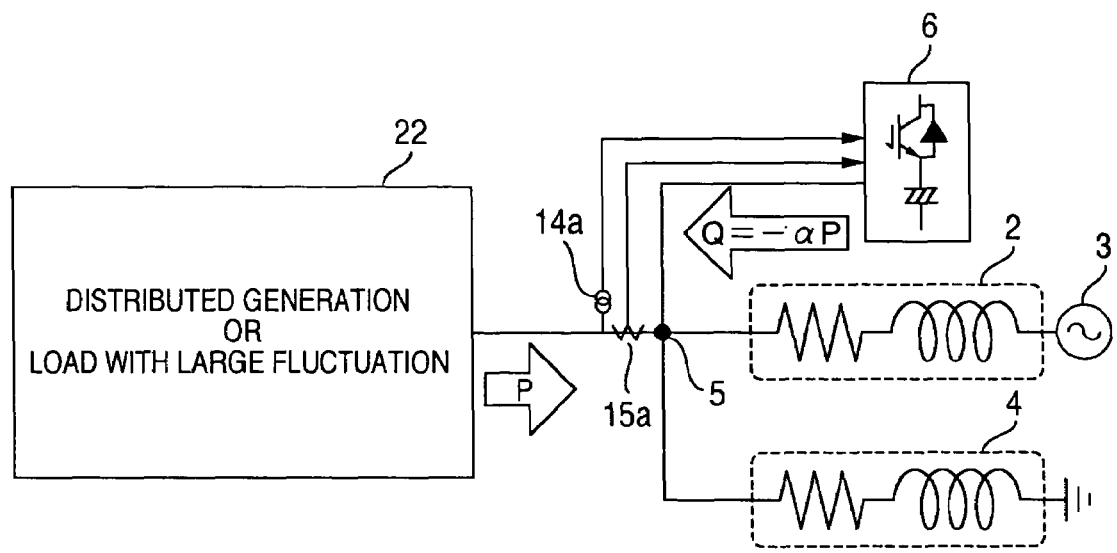
FIG. 14 is a schematic block diagram of a distributed generation provided with a static var compensator, as a fifth embodiment of this invention.

FIG. 14 schematically shows the structure of a distributed generation system provided with a power system stabilizing apparatus according to the fifth embodiment of this invention. This fifth embodiment differs from the first through fourth embodiments in that this invention is applied to a static var compensator 6.

As shown in FIG. 14, a distributed generation 22 or a largely fluctuating load 22 is connected with the trunk system 3 at a point 5 on the system interconnection line 2 to the trunk system 3. The interconnection line 2 has its own impedance. Further, a regular load 4 comprising domestic electric appliances and a static var compensator 6 are also connected at the point 5 of connection.

The static var compensator 6 detects the voltage and the current by means of the voltage detector 14a and the current detector 15a at the point 5 of connection, and further detects and measures the active power fluctuation ΔP and the voltage fluctuation ΔVp arising therefrom, developed between the largely fluctuating load 22 and the point 5 of connection. The measured values are sent out to the next stage of calculation. The static var compensator 6 calculates the control parameter α(t) from the measured values according to the same procedure as described in the first through third embodiment. Consequently, reactive power which is Q=−α(t)P or Q=−α(t)ΔP is supplied to the power system to suppress the system voltage fluctuation.

According to this fifth embodiment of the invention, the procedures as described with the first through third embodiments for obtaining the control parameter to suppress the system voltage fluctuation are applied to the static var compensator 6 so that the static var compensator 6 can produce the reactive power to suppress the voltage fluctuation originating in the distributed generation 22 or largely fluctuating load 22. As a result, the capacity of the static var compensator 6 can be reduced to the minimum one that it requires. Moreover, according to this embodiment, since no interharmonic voltages are inserted into the main system, the quality of power in the main system is by no means degraded.

As described above, in a preferred embodiment of this invention, the distributed generation itself compensates for the voltage fluctuation it develops at the point of connection, thereby effectively suppressing the system voltage fluctuation with a relatively small power output.

In another preferred embodiment of this invention, the voltage fluctuation which the distributed generation itself develops at the point of connection can be compensated by controlling the static var compensator (SVC) placed near the distributed generation, whereby the system voltage fluctuation can be effectively suppressed with a relatively small power output.

In yet another embodiment of this invention, the output level of the reactive power to suppress the voltage fluctuation can be determined online, whereby the system voltage fluctuation due to the active power fluctuation can be effectively suppressed.

In still another embodiment of this invention, the required capacity of the distributed generation can still be decreased when it is necessary to generate that reactive power alone which suppresses the voltage fluctuation component having a short period of fluctuation.

In a further embodiment of this invention, the reactive power is generated in proportion to the active power generated by the distributed generation so that the distributed generation can effectively suppress the voltage fluctuation which it develops, without being affected by the power fluctuation caused by other machinery.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A distributed generation system comprising:
    a power converter connected to a power system, to generate an output voltage and an output current;
    a voltage detector arranged to detect the output voltage outputted from the power converter to the power system;
    a current detector arranged to detect the an output current outputted from the power converter to the power system; and
    control means for controlling the distributed generation according to the detected voltage and current so as to suppress a voltage fluctuation attributable to the output of the distributed generation and developed at the point of connection between the power system and the distributed generation system, wherein the power converter is controlled by the control means.

2. A distributed generation system as claimed in claim 1, wherein the control means for controlling the distributed generation is adapted to adjust a ratio P/Q of an active power P to a reactive power Q, both generated by the distributed generation, according to the detected output.

3. A distributed generation system as claimed in claim 1, wherein the control means for controlling the distributed generation such that a ratio P/Q of an active power P to a reactive power Q, both generated by the distributed generation, is varied with time on the basis of the output voltage and the output current.

4. A distributed generation system as claimed in claim 1, comprising:

an active power detecting means for detecting an active power P of the distributed generation; and means for calculating fluctuating components ΔP and ΔV of an active power P and a reactive power Q, respectively;

wherein the control means controls the distributed generation such that a ratio P/Q of the active power P to the reactive power Q, both generated by the distributed generation, is varied with time on the basis of the active power fluctuation ΔP and the output voltage fluctuation ΔV.

5. A distributed generation system as claimed in claim 1, comprising:

an active power detecting means for detecting an active power P of the distributed generation; and means for calculating a short period fluctuating component ΔP of the active power P;

wherein the control means controls the distributed generation such that a ratio ΔP/Q of the short period fluctuating component ΔP and the reactive power Q generated by the distributed generation is varied according to the detected output.

6. A distributed generation system as claimed in claim 1, comprising:

means for operating the distributed generation under a condition that a reactive power command is kept substantially equal to zero;

means for detecting a voltage fluctuation at the point of connection attributable to an active power P of the distributed generation operated under said condition;

means for obtaining, based on the voltage fluctuation, a target value a for the ratio P/Q of the active power P to the reactive power Q, both generated by the distributed generation; and means for calculating the reactive power command Q* to be generated by the distributed generation on the basis of the target value α;

wherein the control means controls the distributed generation according to the reactive power command Q*.

7. A distributed generation system as claimed in claim 1, wherein the distributed generation is a wind turbine system.

8. A distributed generation system as claimed in claim 7, wherein the wind turbine system comprises:

at least one wind turbine having three blades; and means for extracting a short period fluctuating component ΔP of the active power in a frequency band which approximates three times a rotating frequency of the blades;

wherein the control means controls the wind turbine system such that a ratio ΔP/Q of the short period fluctuating component ΔP and the reactive power Q is varied with time according to the detected output.

9. A distributed generation system as claimed in claim 1, comprising:

a plurality of distributed generations connected in parallel with the power system; and a plurality of control means for detecting the outputs of the respective distributed generations and for controlling the respective distributed generations according to the detected outputs such that the voltage fluctuating components developed at points of connection attributable to the outputs of the respective distributed generations are supressed.

10. A distributed generation system as claimed in claim 1, wherein the power converter converts the alternating power output of the power generator to an AC power of variable voltage/variable frequency; and the control means controls the power converter according to the detected output.

11. A power system stabilizing method for use with a distributed generation system connected with a power system, comprising:

detecting an output of a distributed generation in the distributed generation system;

detecting a voltage fluctuation develored at the point of connection between the distributed generation system and the power system attributable to the output of the distributed generation; and controlling the distributed generation according to the detected output of the distributed generation so that the voltage fluctuation developed at the point of connection between the distributed generation system and the power system is supressed.

12. A power system stabilizing method as claimed in claim 11, comprising controlling the output of the distributed generation such that a ratio P/Q of an active power P to a reactive power Q, both generated by the distributed generation, is varied with time according to the detected output.

13. A power system stabilizing method as claimed in claim 11, comprising:

detecting an output voltage V of the distributed generation;

detecting an output current I of the distributed generation; and controlling the distributed generation such that a ratio P/Q of an active power P to a reactive power Q, both generated by the distributed generation, is varied with time on the basis of the output voltage V and the output current I.

14. A power system stabilizing method as claimed in claim 11, comprising:

detecting an active power P of the distributed generation;

detecting an output voltage V of the distributed generation;

calculating a fluctuating component ΔP of the active power P and a fluctuating component ΔV of the output voltage V; and controlling the distributed generation that a ratio P/Q of the active power P to the reactive power Q, both generated by the distributed generation, is varied with time on the basis of the fluctuating component ΔP and the fluctuating component ΔV.

15. A power system stabilizing method as claimed in claim 11, comprising:

detecting an active power P of the distributed generation;

calculating a short period fluctuating component ΔP of the active power P; and controlling the distributed generation that a ratio ΔP/Q of a short period fluctuating component ΔP to the reactive power Q, both attributable to the distributed generation, is varied with time based on the short period fluctuating component ΔP of the active power P.

* * * * *